(12) United States Patent
Chakiris et al.

(10) Patent No.: US 8,256,682 B2
(45) Date of Patent: Sep. 4, 2012

(54) FOLDABLE DATA CARD ASSEMBLY AND METHOD

(75) Inventors: Phil M. Chakiris, Atlanta, GA (US); Chandilyn Smith, Atlanta, GA (US); Brian Blasius, Marietta, GA (US)

(73) Assignee: e2interactive, Inc., Atlanta, GA (US)

( * ) Notice: Subject to any disclaimer, the term of this patent is extended or adjusted under 35 U.S.C. 154(b) by 1037 days.

(21) Appl. No.: 11/232,573

(22) Filed: Sep. 22, 2005

(65) Prior Publication Data

US 2007/0063052 A1 Mar. 22, 2007

(51) Int. Cl.
*G06K 7/00* (2006.01)
(52) U.S. Cl. ........................................ 235/486; 235/380
(58) Field of Classification Search .................. 235/380, 235/486
See application file for complete search history.

(56) References Cited

U.S. PATENT DOCUMENTS

| | | |
|---|---|---|
| 3,553,440 A | 1/1971 | Dale |
| 3,638,801 A | 2/1972 | Larson |
| 4,194,685 A | 3/1980 | Hill et al. |
| 4,688,683 A | 8/1987 | Thalenfeld |
| 4,916,841 A | 4/1990 | Dawson |
| 5,281,799 A | 1/1994 | McIntire et al. |
| 5,410,136 A | 4/1995 | McIntire et al. |
| 5,427,832 A | 6/1995 | Longtin |
| 5,577,109 A | 11/1996 | Stimson |
| 5,650,209 A | 7/1997 | Ramsburg et al. |
| 5,667,247 A | 9/1997 | Ramsburg et al. |
| 5,673,309 A | 9/1997 | Woynoski |
| 5,684,291 A | 11/1997 | Taskett |
| 5,720,158 A | 2/1998 | Goade |
| 5,740,915 A | 4/1998 | Williams |
| 5,760,381 A * | 6/1998 | Stich et al. ................... 235/380 |
| 5,777,305 A | 7/1998 | Smith et al. |
| 5,785,355 A | 7/1998 | Main |
| 5,842,629 A | 12/1998 | Sprague et al. |
| 5,868,236 A | 2/1999 | Rademacher |
| 5,903,633 A | 5/1999 | Lorsch |

(Continued)

FOREIGN PATENT DOCUMENTS

DE 29924565 U1 11/2003

(Continued)

OTHER PUBLICATIONS

Amerivox Phone Card (Soccer) Sample.

(Continued)

*Primary Examiner* — Kristy A Haupt
(74) *Attorney, Agent, or Firm* — Landmark Intellectual Property Law, PC

(57) ABSTRACT

A foldable data card assembly and method are disclosed. The foldable data card assembly comprises a base assembly with a left portion, a middle portion, and a right potion. The left portion or the middle portion contains an aperture. A data card is enclosed within the base assembly such that the aperture is aligned with a special number on the data card. A security barrier is placed adjacent to the personal account number on the data card, but the security barrier is not placed between the aperture and the special number on the card. During manufacture, the special number is read from the card through the aperture, and the special number used to generate activation information which is printed on the package. The activation information is read at the point of sale, and used to activate the account associated with the activation information.

10 Claims, 10 Drawing Sheets

U.S. PATENT DOCUMENTS

| | | | |
|---|---|---|---|
| 5,918,909 A | 7/1999 | Fiala et al. | |
| 5,958,174 A | 9/1999 | Ramsburg et al. | |
| 6,000,608 A | 12/1999 | Dorf | |
| 6,109,439 A | 8/2000 | Goade, Sr. | |
| 6,148,550 A | 11/2000 | Niedfeld | |
| 6,182,894 B1* | 2/2001 | Hackett et al. | 235/380 |
| 6,199,757 B1 | 3/2001 | Kubert | |
| 6,202,933 B1 | 3/2001 | Poore | |
| 6,220,511 B1 | 4/2001 | Holec | |
| 6,224,108 B1 | 5/2001 | Klure | |
| 6,270,012 B1 | 8/2001 | Dawson | |
| 6,315,206 B1 | 11/2001 | Hansen | |
| 6,328,341 B2* | 12/2001 | Klure | 283/62 |
| 6,386,457 B1 | 5/2002 | Sorie | |
| 6,386,591 B1 | 5/2002 | Blank | |
| 6,405,182 B1 | 6/2002 | Cuervo | |
| 6,439,613 B2 | 8/2002 | Klure | |
| 6,454,165 B1* | 9/2002 | Dawson | 235/381 |
| 6,520,542 B2 | 2/2003 | Thompson et al. | |
| 6,543,809 B1 | 4/2003 | Kristner et al. | |
| 6,588,658 B1 | 7/2003 | Blank | |
| 6,592,035 B2 | 7/2003 | Mandile | |
| 6,623,039 B2 | 9/2003 | Thompson | |
| 6,715,795 B2 | 4/2004 | Klure | |
| 6,832,720 B2 | 12/2004 | Dawson | |
| 6,925,739 B1 | 8/2005 | Cole | |
| 7,028,896 B2 | 4/2006 | Goldstein et al. | |
| 7,063,255 B2 | 6/2006 | Algiene | |
| 7,090,138 B2 | 8/2006 | Rettenmyer | |
| 7,243,839 B2 | 7/2007 | Beck | |
| 2002/0088855 A1* | 7/2002 | Hodes | 235/385 |
| 2002/0169623 A1 | 11/2002 | Call | |
| 2003/0004889 A1* | 1/2003 | Fiala et al. | 705/64 |
| 2003/0028439 A1 | 2/2003 | Cox | |
| 2003/0150762 A1 | 8/2003 | Biller | |
| 2004/0046035 A1 | 3/2004 | Davila et al. | |
| 2004/0139318 A1 | 7/2004 | Fiala et al. | |
| 2004/0210449 A1 | 10/2004 | Breck | |
| 2005/0017502 A1* | 1/2005 | Chariker | 283/106 |
| 2005/0061889 A1 | 3/2005 | McGee | |
| 2005/0242193 A1 | 11/2005 | Smith | |
| 2005/0279825 A1* | 12/2005 | Ashby et al. | 235/380 |
| 2006/0144926 A1 | 7/2006 | Jacobs | |
| 2006/0186196 A1 | 8/2006 | Schultz et al. | |
| 2006/0243792 A1 | 11/2006 | Morello et al. | |
| 2007/0045401 A1* | 3/2007 | Sturm | 235/380 |
| 2007/0063021 A1 | 3/2007 | Chakiris | |
| 2007/0063052 A1 | 3/2007 | Chakiris | |

FOREIGN PATENT DOCUMENTS

| | | |
|---|---|---|
| JP | 2000-60623 A | 2/2000 |
| WO | WO 03/008202 A1 | 1/2003 |

OTHER PUBLICATIONS

AT&T Teleticket (Holiday Ticket) Sample.
AT&T Prepaid Card (Flintstones) Sample.
AT&T Teleticket (Limited Edition) Sample.
GTE (Super Bowl 29) Sample.
Pacific Bell Prepaid Phone Card (Olvera St.) Sample.
InComm Card (Popeye) Sample.
GlobalLink (Lipton) Sample.
Pacific Bell Prepaid Phone Card (Christmas) Sample.
GE Exchange (NY Times) Sample.
AT&T Prepaid Card (25 Units) Sample.
Amerivox Phone Card (Hawaii) Sample.

* cited by examiner

FOLDABLE DATA CARD ASSEMBLY AND METHOD

BACKGROUND OF THE INVENTION

Data cards such as gift cards and telephone calling cards permit consumers to prepay for goods or services. An account associated with the data card is debited as goods and services are purchased using the card.

Data cards typically include raised or protruding numbers which are a personal account number (PAN), and identify the account associated with the card. Data cards further typically contain a magnetic strip which contains all the data needed for commercial transactions: the PAN, the expiration date, and sometimes the name of the user. These magnetic strips must comply with commercial standards in order to be useful at most stores.

In many instances, the data cards are available for purchase directly from large retail displays. For security purposes, the data cards may be unactivated or have no value associated with them until a purchaser pays a retailer to activate the card or to associate a certain value with the card. Despite these security features to discourage theft, many criminals still steal the data cards, often by removing the card from its packaging.

Additionally, criminals may attempt to steal information by copying the raised numbers that press through the package. Copying these raised numbers (possibly by etching) is a substantial first step towards penetrating the security procedures of the data card system. The criminal would then wait until the customer purchased and activated the card, and then attempt to obtain additional security information (such as a Personal Identification Number) from the customer through theft or trickery.

Accordingly, it may be desirable to provide a data card which is concealed within its packaging to discourage theft of the cards.

Generally, during manufacturing the individual unique data card is physically matched to an individual unique package. For example, U.S. Pat. No. 6,439,613 to Klure addresses this matching, and discloses a procedure to confirm "that no mismatching of the separately manufactured card" has occurred during packaging. See, e.g., U.S. Pat. No. 6,439,613 at column 4, line 2. The disclosure of these patents are incorporated herein by reference.

SUMMARY OF THE INVENTION

One embodiment of the invention comprises a card package wherein a special number is written on the data card, the data card is folded into a base assembly, and the special number is visible through an aperture in the base assembly. The special number is associated with the card's personal account number (PAN). This association may comprise the special number being stored in the same database as the PAN. The special number may be used to generate activation information, or it may be associated with activation information. The activation information may be printed on the outside of the card package in the form of a magnetic strip or a bar code during manufacture. A security barrier may be positioned inside of the card package to prevent the card's protruding PAN from pressing through the base assembly.

The activation information may be presented on the card package as a magnetic strip, bar code, smartchip, SIMS card or any other marking, indicia, or storage system capable of representing or providing information that identifies the data card and/or otherwise distinguishes it from other data cards. The activation information may contain a serial number, a UPC, a vendor identification number, a value, and any other type of card identifiable information. The activation information may preferably be used to activate the data card according to the methods described in U.S. Pat. No. 5,777,305 to Smith et al. or the methods described in U.S. application Ser. No. 09/641,363 to Graves et al., both of which are incorporated herein by reference.

Another embodiment comprises multiple data cards enclosed inside a single package, wherein the multiple cards may be simultaneously activated.

DETAILED DESCRIPTION OF EXEMPLARY EMBODIMENTS

Figure 1:
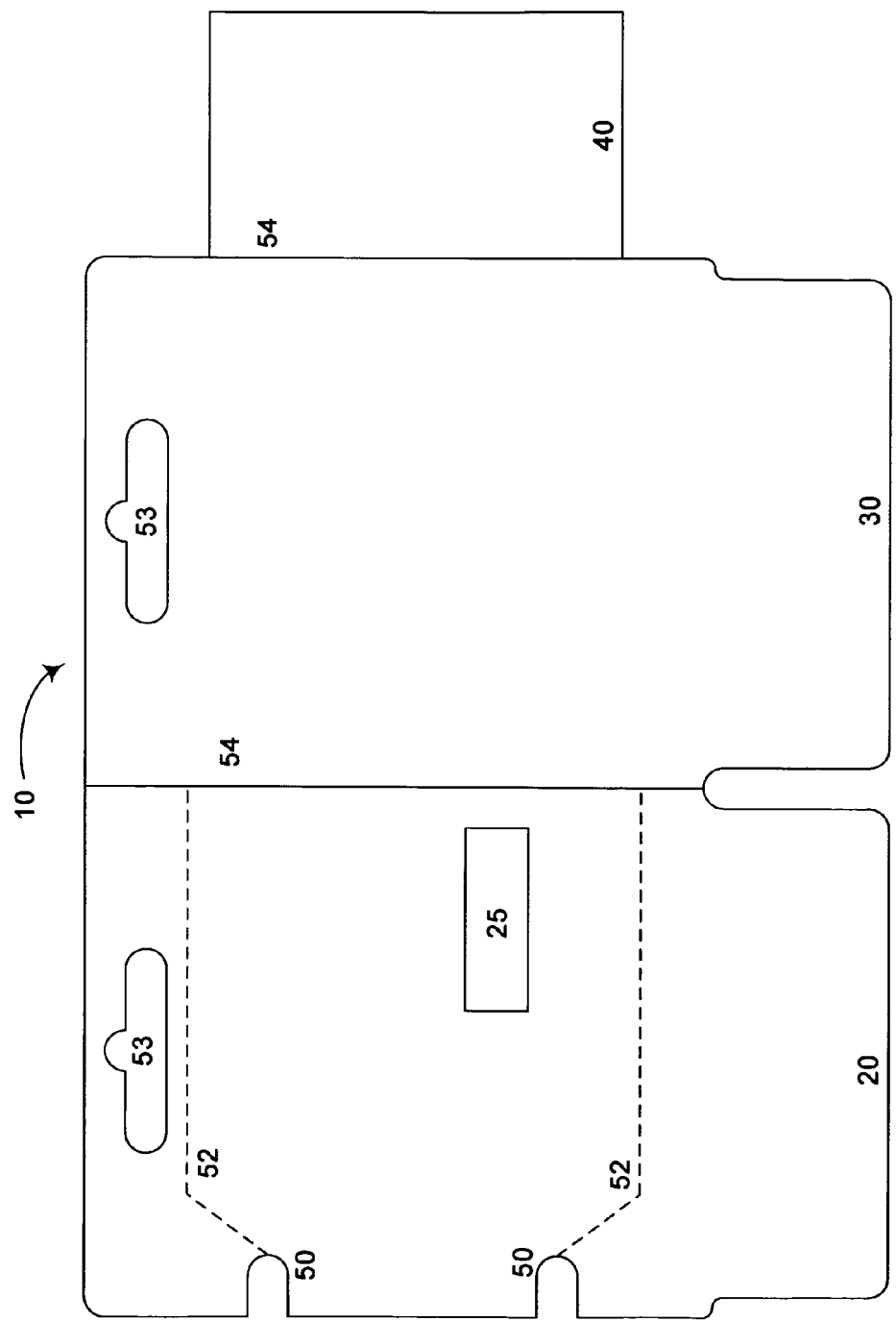
FIG. 1 displays a foldable base assembly, in an exemplary embodiment of the invention.

Various card packages according to the present invention provide various benefits. For instance, a card may be contained in the package and may not be visible from the outside. The card package itself may have an indicia of an identifier associated with the card number. The indicia of the card package may be used to activate the card without ever exposing the card number on the card. Thus, criminals may be unable to obtain a card number printed or embossed on the card. In some embodiments, an aperture may expose a portion of the card, such as an indicia of an identifier of the card.

According to some embodiments, a method of manufacturing a card and card package comprises inserting a unique data card into a standard card package, and then modifying the package so that it becomes uniquely matched to the unique data card. An advantage of this manufacturing method is that there is no risk of mismatching a card to the wrong package.

According to some embodiments, a data card is concealed within its packaging to discourage theft of the cards. In some embodiments, a security barrier is enclosed within the package to prevent the raised numbers of the data card from pressing into the package and becoming susceptible to copying by etching.

According to some embodiments, multiple data cards are placed within a single package. For example, four cards each worth $20 may be sold simultaneously in a single package for $80, and may be simultaneously activated. Similarly, a single $50 card and three $10 cards could be sold simultaneously in a single package for $80, and may be simultaneously activated.

The present invention, as defined in the claims, can be better understood with reference to the following drawings. The drawings are not necessarily to scale, emphasis instead being placed upon clearly illustrating the principles of the present invention. Throughout the figures, like reference numerals designate corresponding parts throughout the several views.

FIG. 1 displays a foldable base assembly 10, in an exemplary embodiment of the invention. The base assembly 10 may be constructed of a suitable packaging material that is relatively thin and relatively rigid, for example cardboard or plastic. The base assembly 10 may comprise three major portions: the left portion 20, the middle portion 30, and the right portion 40.

The left portion 20 may comprise an aperture 25, notches 50, perforations 52, and/or a hanging hole 53. A folding line 54 may separate the left portion 20 from the right portion 30. The folding line 54 may comprise a line of weakness created by perforations, by scoring, or by other means (e.g., grooving, scratching, or notching). The aperture 25 may be covered by a transparent film such as cellophane.

The middle portion 30 may comprise a hanging hole 53 and/or folding lines 54. A first folding line 54 may separate the left portion 20 from the middle portion 30. In some embodiments, a second folding line 54 may separate the middle portion 30 from the right portion 40.

The right portion 40 may be relatively smaller than (or bigger than or equal in size to) the middle portion 30. The right portion 40 may be separated from the middle portion 30, e.g., by a folding line 54.

In some embodiments, the base assembly 10 may be folded to enclose a card. The card may be placed flat across the face of the middle portion 30. For instance, the card may be placed in approximately the center of the package, and the length of the card may be parallel or perpendicular to the line of weakness 54. As viewed from the top-down view of FIG. 1, the right portion 40 may be folded along line of weakness 54 in an upward direction and onto the front of middle portion 30 (e.g., and onto the top of the card). The left portion may also be folded along its line of weakness 54 in an upward direction so that it is also laying across the face of middle portion 30 (e.g., and also laying across the folded left portion 20). Adhesive and/or tabs or other folds may be used to cause the folded assembly 10 to remain in its folded position, thereby enclosing the card. The card may then be displayed and sold in a merchant store. After activation and distribution to a customer, the customer may open the card package by tearing at the perforations 52 to expose the card.

Figure 2:
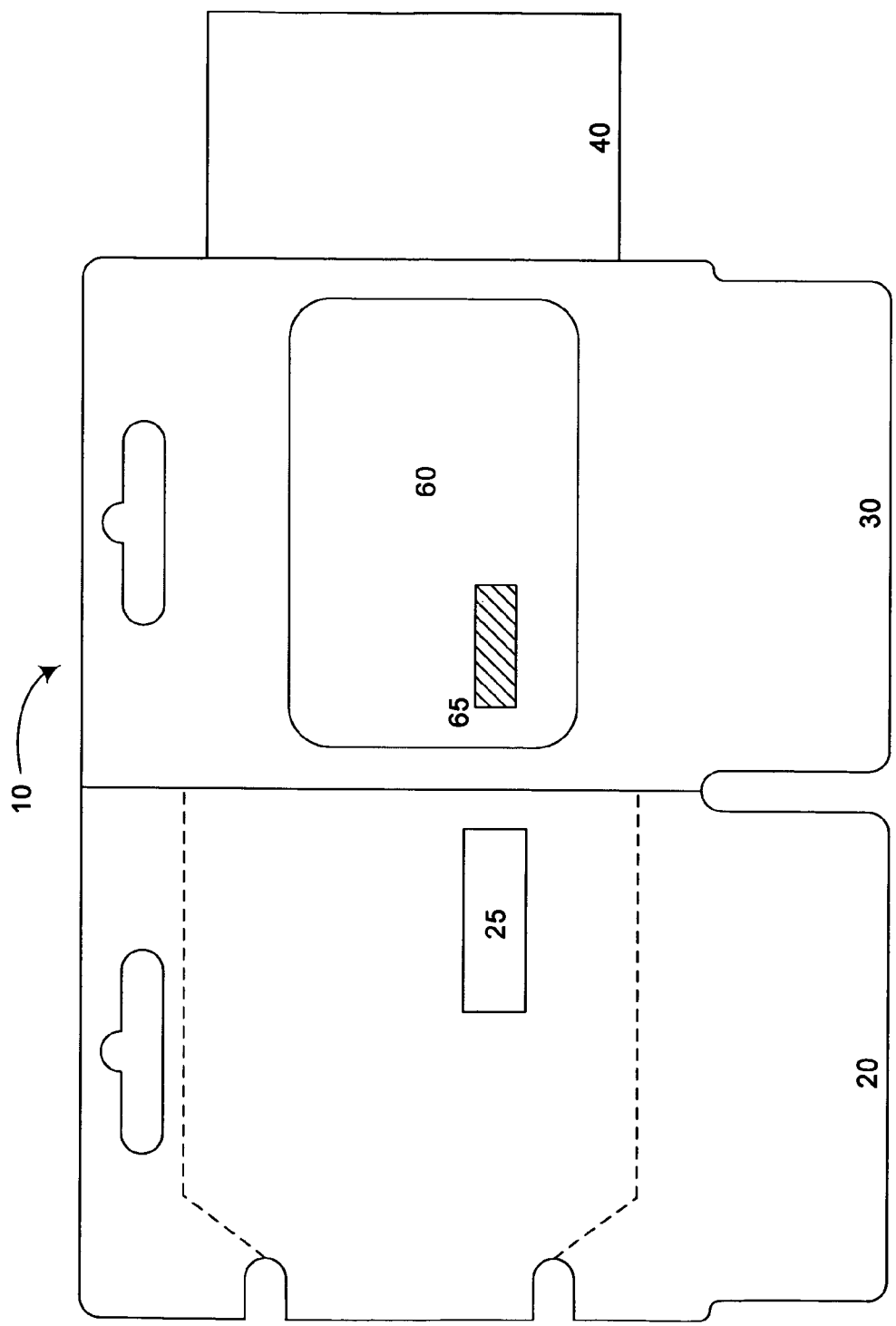
FIG. 2 displays a data card properly positioned on the base assembly, in an exemplary embodiment of the invention.

FIG. 2 displays a data card 60 positioned on the base assembly 10, in an exemplary embodiment of the invention. Data card 60 is shown positioned on the middle portion 30. Data card 60 may be affixed in its location on the assembly 10, e.g., via adhesive such as glue or tape or other coupling mechanism (e.g., adhesive between the card 60 and middle portion 30). Data card 60 may comprise any transaction card as known in the art, such as a prepaid card (e.g., for use related to telecommunications service). Data card may have a barcode, magnetic stripe, or any other features of well-known transaction cards.

Data card 60 may comprise a relatively thin and relatively rigid material such as cardboard or plastic. Data card 60 may have a special number 65. The special number may be any number, code, or symbol. The special number 65 may be associated with the personal account number (PAN) of the data card. In some embodiments, the special number 65 may be generated at the same time as the PAN, but might not be the same number as the PAN. Special number 65 may be a 9 digit number (or have any other number of alpha-numeric symbols), or may be any optically recognizable image. For instance, the special number may be adapted to be read by an optical reader device, such as an OCR (optical character recognition) device. Special number 65 may be located on the bottom left of the data card. Special number 65 may be sized smaller than the aperture 25, so that the entire special number 65 will be visible through aperture 25 after assembly is completed.

Figure 3:
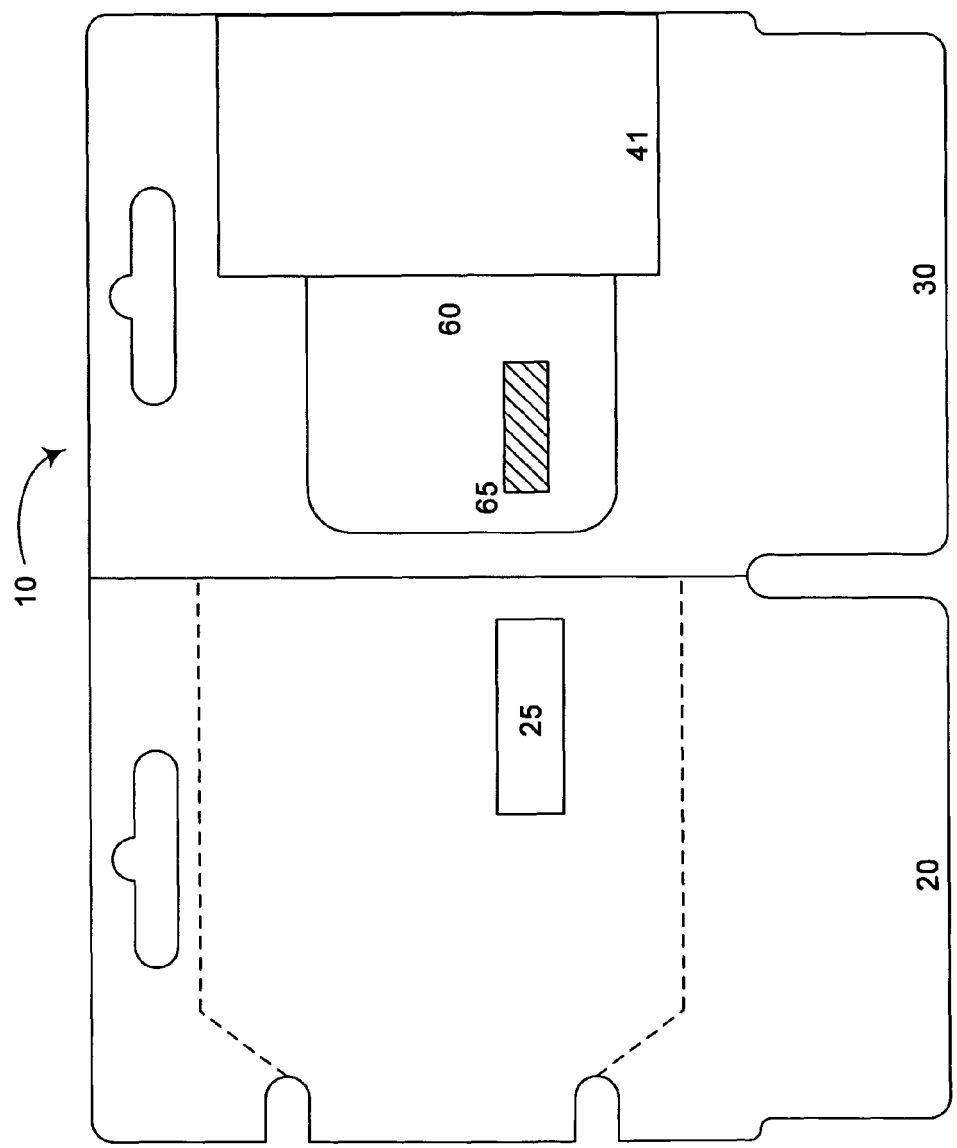
FIG. 3 displays the right portion of the base assembly folded over the data card in a stowed position, in an exemplary embodiment of the invention.

FIG. 3 displays the base assembly 10 wherein the back of the right portion 41 is folded over the data card 60 in a stowed position, in an exemplary embodiment of the invention. The special number 65 is not covered. (In other embodiments, the special number 65 may be covered or may not exist.)

Figure 4:
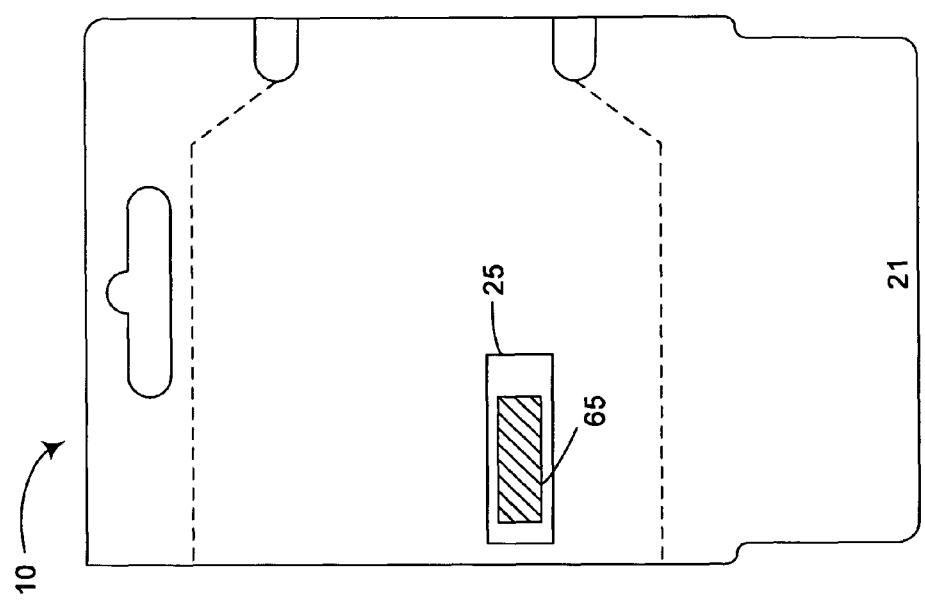
FIG. 4 displays the left portion of the assembly folded over the data card in a covering position, in an exemplary embodiment of the invention.

FIG. 4 displays the back of the left portion 21 of the base assembly 10 folded over the data card in a covering position, in an exemplary embodiment of the invention. The special number 65 is visible through the aperture 25. The base assembly 10 may be fixed in this folded position by adhesive along the edges, or by staples along the edges, or by heat treatment along the edges, or by shrink wrapped cellophane, or by any of numerous methods known in the art.

Figure 5:
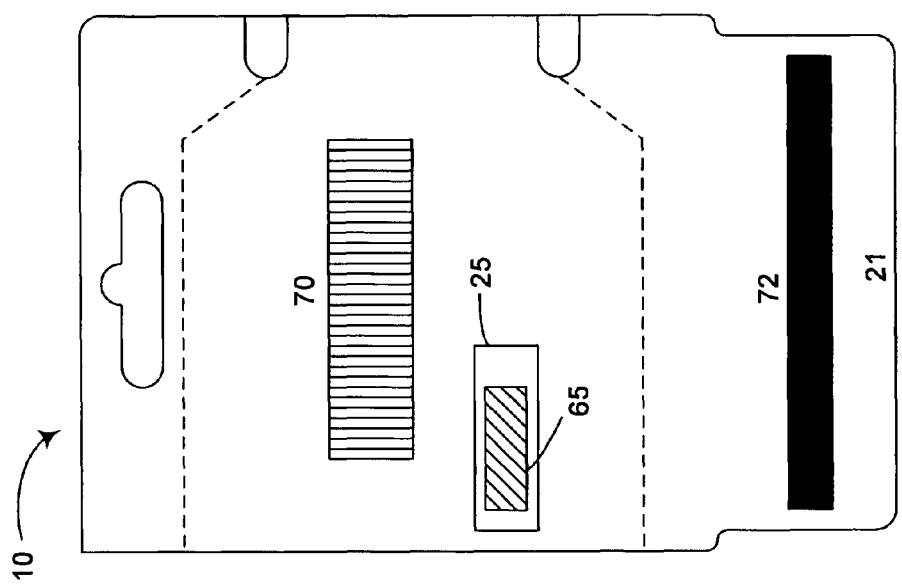
FIG. 5 displays a bar code and a magnetic strip on the base assembly, in an exemplary embodiment of the invention.

FIG. 5 displays a bar code 70 and a magnetic strip 72 on the base assembly, in an exemplary embodiment of the invention. The bar code 70 may be a bar code, or may be any optically readable image containing information. The total thickness of the assembled package where the magnetic strip 72 is located may be between 24 mils and 30 mils so that it is readable through most commercial magnetic strip readers.

The bar code 70 and/or magnetic strip 72 may comprise information identifying and/or associated with a card package and/or a card (e.g., a card inside a card package). For instance, such information may be used at a point of sale to activate the card, e.g., as described in U.S. Pat. No. 5,777,305 to Smith et al. Such information may be stored in a database record that stored other information about an associated card, such as a card number, special number, and/or PAN.

Figure 6:
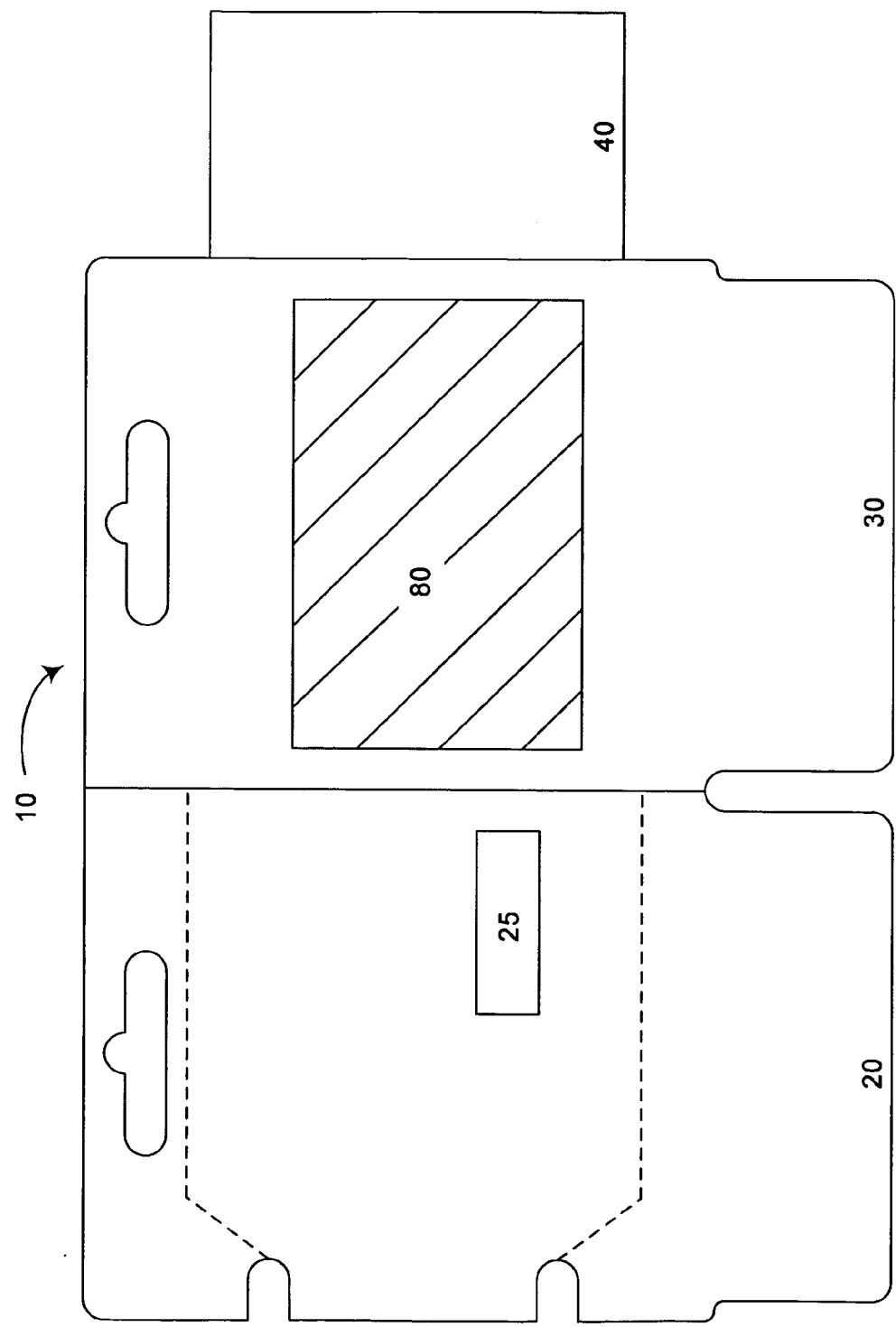
FIG. 6 displays a security barrier, properly positioned on the base assembly, in an exemplary embodiment of the invention.

FIG. 6 displays a security barrier 80 positioned on the base assembly 10 in an exemplary embodiment of the invention. Security barrier 80 may be securely fastened to the middle portion 30 by adhesive or other methods. The data card 60 may be positioned on top of the security barrier 80 in such a way that the protruding digits (e.g., Personal Account Number) of the data card are adjacent to the security barrier 80. When the security barrier 80 is positioned adjacent to protruding digits (such as an embossed card number) so that it "covers" the digits, it may prevent unauthorized users from attempting to determine the digits without opening the card package (e.g., by viewing any deformations in the surface of the card package caused by embossed numbers, or by detecting any magnetic information stored on the card. Accordingly, the security barrier may comprise a hard surface and a dark shape. In some embodiments, the security barrier may have electromagnetic properties that prevent unauthorized users from determining any electromagnetic information stored on the card (e.g., in a magnetic stripe of the card).

In some embodiments, the security barrier 80 may be at least as large as the area of the protruding digits, and in some embodiments it may be larger than the entire data card 60. The security barrier 80 may consist of a single unfolded sheet of material, or may be a folded sheet of material, or may be multiple sheets of material. The security barrier 80 may include printed terms and conditions regarding the data card.

In an alternate embodiment (not shown), the security barrier 80 may be positioned and fastened to the left portion 20 in such a way as to not cover the aperture 25. The data card 60 may be positioned such that the protruding digits are adjacent to the security barrier after assembly.

In an alternative embodiment (not shown), the aperture 25 may be in the middle portion 30, e.g., instead of in the left portion 20. The data card 60 may be positioned such that the special number 65 is aligned with the aperture 25 after assembly. The security barrier 80 may be positioned adjacent to the protruding digits of the data card, e.g., but not blocking the aperture 25.

Figure 7:
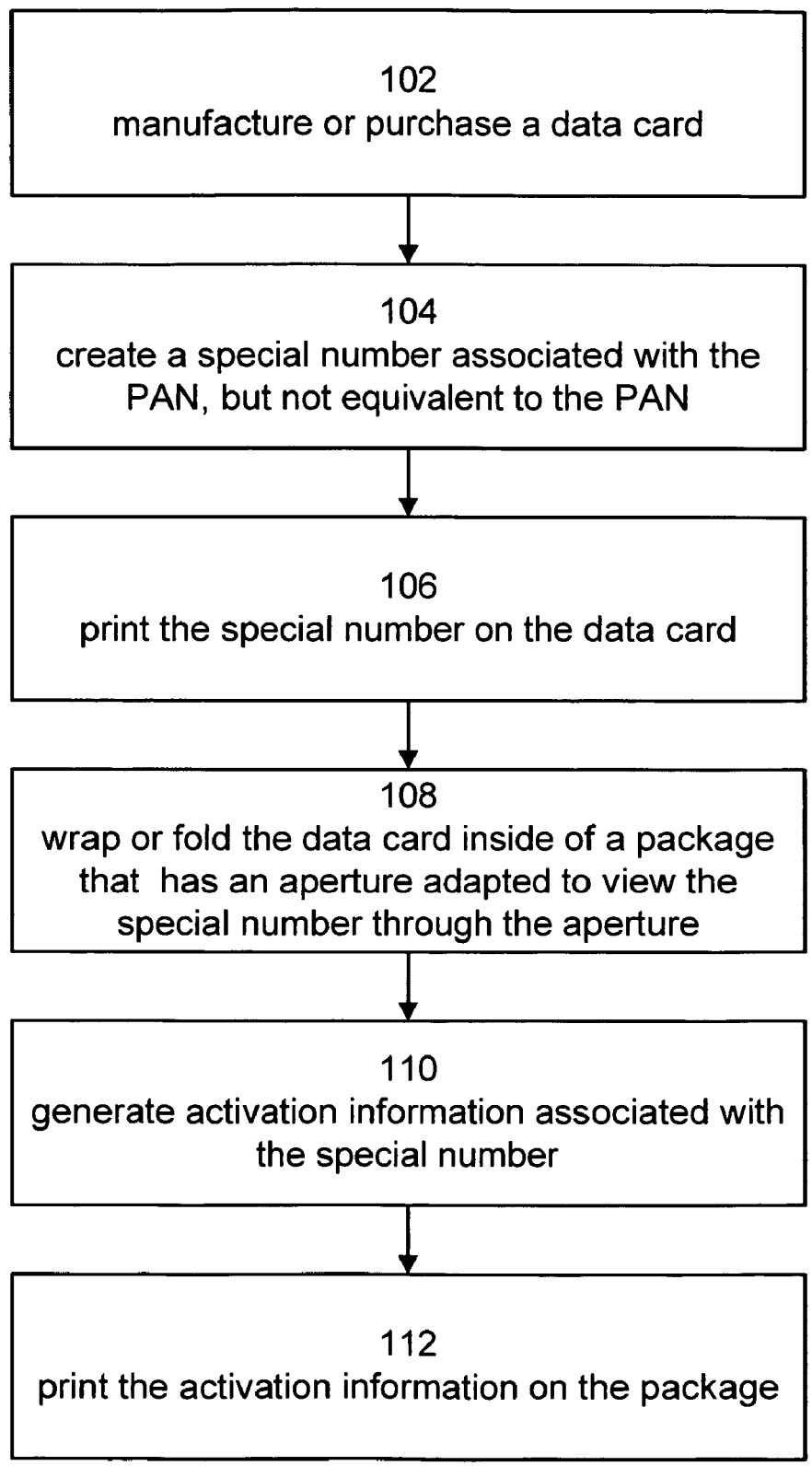
FIG. 7 displays the manufacturing steps, in an exemplary embodiment of the invention.

FIG. 7 displays the manufacturing steps, in an exemplary embodiment of the invention. In block 102, manufacture or purchase a data card comprising an indicia of a personal account number (PAN) is purchased or manufactured. In block 104, create a special number associated with the PAN, but not equivalent to the PAN. In block 106, print the special number on the data card. In block 108, wrap or fold the data card inside of a package that has an aperture adapted to view the special number through the aperture. In block 110, generate activation information associated with the special number. Block 112, print the activation information on the package.

Note that other manufacturing embodiments of the invention may include some, all, or none of the actions mentioned in the blocks, and the actions may occur in other orders. For example, a security barrier may be inserted or attached adjacent to the PAN before wrapping or folding the package. Specifically, a security barrier such as a folded security paper may be placed in front of the card before the card is tipped into position in the package.

Figure 8:
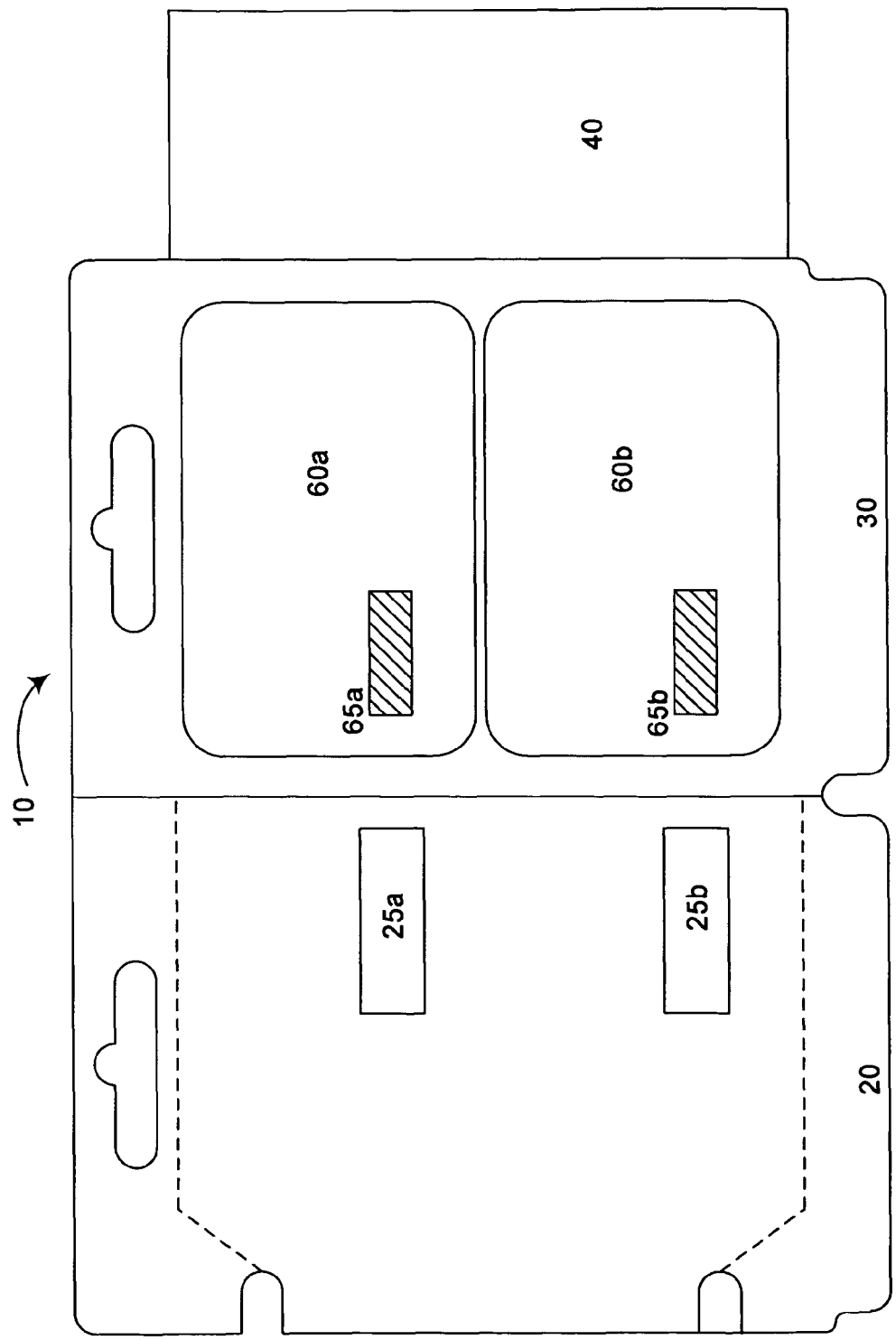
FIG. 8 displays two data cards positioned in a base assembly with two apertures, in an exemplary embodiment of the invention.

FIG. 8 displays two data cards positioned in a base assembly with two apertures, in an exemplary embodiment of the invention. Note that the base assembly 10 previously shown in FIG. 1 has been substantially modified to enclose multiple data cards. Specifically, the left portion 20 now has two apertures: first aperture 25a and second aperture 25b. First aperture 25a is positioned so as to align with the special number 65a of first data card 60a after folding. Second aperture 25b is positioned so as to align with the special number 65b of second data card 60b after folding. Note that the notches, perforations, and right portion 40 of base assembly 10 have been modified slightly (in comparison to base assembly 10 as shown in FIG. 1) to accommodate the two data cards. Although there are two aperture areas it is not necessary it can be done with one aperture. The cards can be optically read before inserting the cards into the packaging. The packaging displayed is merely examples of the type of packaging it can be in the form of a box, a sleeve or other types of containers. The key is that one scan at a retail POS system activates all cards contained within the package.

In an alternative embodiment (not shown), the base assembly shown in FIG. 8 may be elongated in a horizontal direction to accommodate the two data cards 60a and 60b placed adjacent to each other in a horizontal fashion, rather than placed adjacent in a vertical fashion as shown as shown in FIG. 8.

In an alternative embodiment (not shown), additional cards may be accommodated by placing apertures in the middle portion of the base assembly. For example, in FIG. 8, a third card (not shown) may be placed adjacent to and directly below card 60a, so that the special number of the third card may face downward and may be visible through a third aperture (not shown) in the middle portion 30. Similarly, a fourth card (not shown) may be placed adjacent to and directly below the second card 60b, so that the special number of the fourth card may be visible through a fourth aperture (not shown) in the middle portion 30.

Thus, a total of four cards could easily be accommodated inside of a base assembly with four apertures (two apertures in the left portion, and two apertures in the middle portion), but with the same maximum dimensions as the base assembly shown in FIG. 1. All of the special numbers of the cards may be visible through their respective apertures. Alternately, a single special number readable through a single aperture may be associated with all four cards.

The multiple special numbers may be read during the packaging process, and may be used to generate and print one or more bar codes or magnetic strips or readable data sets on the package. During a sale, said one or more bar codes or magnetic strips or readable data sets may be read, and may be used to activate the multiple cards contained within the package.

Figure 9:
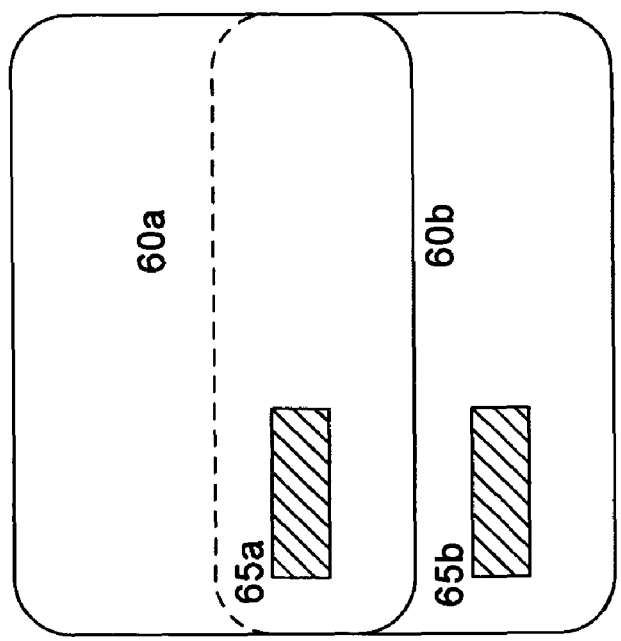
FIG. 9 displays two data cards in a horizontal overlapping position, in an exemplary embodiment of the invention.

FIG. 9 displays two data cards in a horizontal overlapping position, in an exemplary embodiment of the invention. Two or more data cards may be placed in a horizontal overlapping position such that all of the special numbers remain visible.

Figure 10:
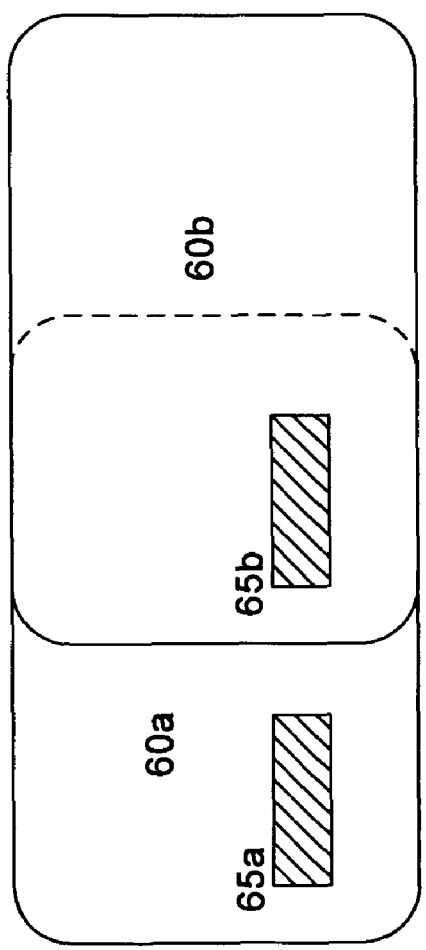
FIG. 10 displays two data cards in a vertical overlapping position, in an exemplary embodiment of the invention.

FIG. 10 displays two data cards in a vertical overlapping position, in an exemplary embodiment of the invention. Two or more data cards may be placed in a vertical overlapping position such that all of the special numbers remain visible.

In an alternative embodiment (not shown), multiple data cards may be stacked like a deck of cards so that only one special number may be visible through one aperture. In this embodiment, said only one visible special number may be associated with the special numbers that are not visible. The visible special number may be used to generate one or more bar codes or magnetic strips or other readable data sets on the package. During a sale, said one or more bar codes or magnetic strips or readable data sets may be read, and may be used to activate the multiple cards contained within the package.

In an alternative embodiment (not shown), multiple data cards may be oriented in a strip, and then folded in an alternating fashion like an accordion or a street map so that at least one special number is visible. In this embodiment, said at least one visible special number may be associated with the special numbers that were not visible. The at least one visible special number may be used to generate one or more bar codes or magnetic strips or other readable data sets on the package. During a sale, said one or more bar codes or magnetic strips or readable data sets may be read, and may be used to activate the multiple cards contained within the package.

The present invention is not to be limited in scope by the specific exemplary embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Accordingly, the claims set forth below should be construed in view of the full breath and spirit of the present invention as disclosed herein.

What is claimed is:

1. A method of manufacturing a foldable data card assembly comprising:
   manufacturing or purchasing a specific data card comprising an indicia of a personal account number (PAN);
   creating a special number associated with the PAN, but not equivalent to, and separate from and different from, the PAN;
   printing the special number on the specific data card;
   after the printing step, wrapping or folding the specific data card inside a package, the package not yet associated with the specific data card;

reading or otherwise obtaining the special number from the specific data card;

after the reading or otherwise obtaining step and with the specific data card packaged inside the package, generating activation information and is associated with the special number and is separate from and different from the special number, thereby linking the specific data card and the activation information, such that an activation transaction using the activation information renders the specific data card available for use; and printing the activation information on the package with the specific data card inside.

2. The method of claim 1, wherein the indicia of activation information is one or more selected from the group consisting of: a magnetic strip, a bar code, a smartchip, and a RFID.

3. The method of claim 1 further comprising:

generating activation information using the special number and specific information associated with a specific retailer.

4. The method of claim 1 further comprising:

printing the activation information on the package as a smartchip or other electronic device.

5. The method of claim 1 further comprising:

reading the activation information at the point of sale;

activating an account associated with the activation information.

6. The method of claim 1 wherein the indicia of the personal account number (PAN) protrudes from the card, further comprising:

placing a security barrier adjacent to the protruding indicia of the data card, wherein the security barrier is adapted to prevent the protruding numbers from legibly deforming the package, and wherein the security barrier is not positioned between the aperture and the special number.

7. The method of claim 6, wherein:

the security barrier is constructed from a folded sheet;

the folded sheet is placed in front of the card before the card is tipped into position; and the folded sheet comprises graphics, coupons, or terms and conditions.

8. A method of manufacturing a data card assembly comprising:

manufacturing or purchasing multiple data cards, each data card comprising an indicia of a personal account number (PAN);

creating a special number associated with the multiple PANs of the multiple data cards, the special number being separate from and different from the multiple PANs, the special number comprising a number, or a set of letters, or any unique identification code;

printing or storing the special number on at least one data card from the multiple data cards;

after the printing or storing of the special number, wrapping or folding the multiple data cards inside of a package not yet associated with the multiple data cards that has a single aperture adapted to view the special number through the aperture;

reading or otherwise obtaining the special number from at least one of the multiple data cards;

after the reading or otherwise obtaining step and with the specific data card packaged inside the package, generating activation information for the multiple data cards in the package associated with the special number, thereby linking the multiple data cards and the activation information, such that an activation transaction using the activation information renders each of the multiple data cards available for use, the activation information being separate from and different from the special number;

printing an indicia of the activation information on the package with the multiple data cards inside.

9. The method of claim 8, further comprising:

reading the activation information at the point of sale; and activating the accounts associated with the activation information.

10. A system for manufacturing a data card assembly, comprising:

one or more data cards, each comprising:

a personal account number (PAN) printed on or stored on the card; and a special number printed on or stored on the card, the special number associated with the PAN but being separate from and different from the PAN;

one or more packages, each comprising a foldable piece of cardboard or plastic or rigid material with activation information separate from and different from the special number printed on or stored on the one or more packages;

a packaging mechanism for packaging the one or more data cards in the one or more packages such that the PAN is not visible, the one or more packages not yet associated with the specific data card;

a reading device for reading, capturing, or recording the special number from each of the one or more data cards;

an activation information generator, for generating activation information specific to and associated with each special number;

a printing or recording device for printing or recording the activation information generated specific to and associated with the special number on the one or more packages; and a database comprising records of the special numbers and the activation information from each data card packaged within a package, thereby providing an association between the special number from each data card with the activation information from the package that the data card is packaged within.

\* \* \* \* \*